United States Patent [19]

Kawaguchi et al.

[11] Patent Number: 5,411,794
[45] Date of Patent: May 2, 1995

[54] HEAT-SCREENING GLASS

[75] Inventors: Jun Kawaguchi; Hiroaki Kobayashi; Hidemi Nakai, all of Osaka, Japan

[73] Assignee: Nippon Sheet Glass Co., Ltd., Osaka, Japan

[21] Appl. No.: 933,791

[22] Filed: Aug. 24, 1992

[30] Foreign Application Priority Data

Aug. 29, 1991 [JP] Japan .................. 3-218234

[51] Int. Cl.⁶ ............................. C03C 17/34
[52] U.S. Cl. .................... 428/216; 428/432; 428/433; 428/428; 428/697; 428/698; 428/699; 428/701; 428/702; 428/913
[58] Field of Search ............... 428/432, 433, 216, 698, 428/446, 428, 701, 697, 699, 702, 913

[56] References Cited

U.S. PATENT DOCUMENTS

| | | | |
|---|---|---|---|
| 3,885,855 | 5/1975 | Gross | 428/427 |
| 4,690,871 | 9/1987 | Gordon | 428/432 |
| 5,061,568 | 10/1991 | Kessel et al. | 428/426 |
| 5,092,244 | 2/1992 | Biornard | 428/698 |
| 5,110,637 | 5/1992 | Ando et al. | 428/432 |
| 5,112,675 | 5/1992 | Wuest et al. | 428/216 |

FOREIGN PATENT DOCUMENTS

| | | |
|---|---|---|
| 204693 | 12/1983 | Germany . |
| 60-42253 | 3/1985 | Japan . |
| 63-242948 | 10/1988 | Japan . |
| 2-233534 | 9/1990 | Japan . |
| 9009883 | 9/1990 | WIPO . |

OTHER PUBLICATIONS

Valknoe et al "Selective transmission of thin T.N filorus" SPIE lat Soc. Opt Eng. 1983 vol 408 pp. 375–381.
Patent Abstracts of Japan, vol. 15, No. 96 (C–812) 7 Mar. 1991.
Patent Abstracts of Japan, vol. 14, No. 427 (C–758) 13 Sep. 1990.
Patent Abstracts of Japan, vol. 13, No. 402 (C–633) 6 Sep. 1989.
Patent Abstracts of Japan, vol. 12, No. 496 (C–555) 23 Dec. 1988.
Patent Abstracts of Japan, vol. 14, No. 129 (P–1020) 12 Mar. 1990.
Patent Abstracts of Japan, vol. 14, No. 113 (M–944) 2 Mar. 1990.

*Primary Examiner*—A. A. Turner
*Attorney, Agent, or Firm*—Sughrue, Mion, Zinn, Macpeak & Seas

[57] ABSTRACT

Heat-screening glass comprising a transparent glass substrate having consecutively thereon a heat-screening film, a first transparent protective film, and a second transparent protective film, the first transparent protective film comprising at least one member selected from the group consisting of silicon nitride, silicon dioxide, stannic oxide, oxynitride of silicon carbide, and oxynitride of tantalum carbide, and the second transparent protective film comprising at least one member selected from the group consisting of zirconium oxide, tantalum pentoxide, niobium oxide, zirconium oxynitride, tantalum oxynitride, and niobium oxynitride, and having a thickness of from 2 to 15 nm.

8 Claims, 1 Drawing Sheet

HEAT-SCREENING GLASS

FIELD OF THE INVENTION

The present invention relates to heat-screening glass suitable for automotive windows and building glazing, and more particularly, it relates to heat-screening glass having improved wear resistance and chemical resistance owing to double protective films formed on a heat-screening film.

BACKGROUND OF THE INVENTION

Attempts have been made to use heat-screening glass coated with a metal nitride (such as TiN, ZrN, and CrN) in a single glazing in view of the fact that it is superior in chemical resistance and wear resistance to heat-screening glass coated with a noble metal (such as Ag). For the heat-screening glass to have practical chemical resistance and wear resistance which permit it to be used in a single glazing, it should be provided with a protective film which is composed of an adequate material and has an adequate thickness and layer constitution. As the protective film used in the conventional heat-screening glass composed of a glass substrate and a heat-screening film formed thereon, those composed of $SiO_2$ (as shown in JP-A-63-206333), tantalum oxide (as shown in JP-A-1-145535 and JP-A-2-164744), and oxide of zirconium boride (as shown in JP-A-2-901 and JP-A-1-314163) have been disclosed. The term "JP-A" used herein means an unexamined published Japanese patent application.

The heat-screening glass provided with a protective film composed of $SiO_2$ has good wear resistance and acid resistance owing to $SiO_2$. However, the protective film has to be thicker to compensate for its poor alkali resistance. For example, an $SiO_2$ protective film thicker than 1 μm does not show noticeable change in external appearance even after corrosion by alkaline substances. The thicker $SiO_2$ protective film takes a long time for its formation, which leads to the poor productivity of heat-screening glass.

The heat-screening glass provided with a protective film composed of tantalum oxide has good acid and alkali resistance. However, it lacks practically high wear resistance and becomes noticeably hazy when the protective film wears.

The heat-screening glass provided with a protective film composed of oxide of zirconium boride has excellent wear resistance and alkali resistance. However, it is poor in acid resistance. In addition, this protective film is difficult to be produced at a high speed in a stable manner by the direct current sputtering method which is a favorable method for coating a large glass plate. This disadvantage of the direct current sputtering is due to the fact that it employs a target of sintered zirconium boride which is not sufficiently conductive and contains pores which cause arcing during sputtering. Arcing gives rise to fine particles which stick to the film to form pinholes.

SUMMARY OF THE INVENTION

An object of the present invention is to provide heat-screening glass which has such excellent chemical and wear resistance that it can be used in single glazing and also has coating films which can be formed rapidly in a short time with high productivity.

Other objects and effects of the present invention will be apparent from the following description.

The present invention relates to heat-screening glass comprising a transparent glass substrate having consecutively thereon a heat-screening film, a first transparent protective film, and a second transparent protective film, the first transparent protective film comprising at least one member selected from the group consisting of silicon nitride, silicon dioxide, stannic oxide, oxynitride of silicon carbide, and oxynitride of tantalum carbide, and the second transparent protective film comprising at least one member selected from the group consisting of zirconium oxide, tantalum pentoxide, niobium oxide, zirconium oxynitride, tantalum oxynitride, and niobium oxynitride, and having a thickness of from 2 to 15 nm.

DETAILED DESCRIPTION OF THE INVENTION

Figure 1:
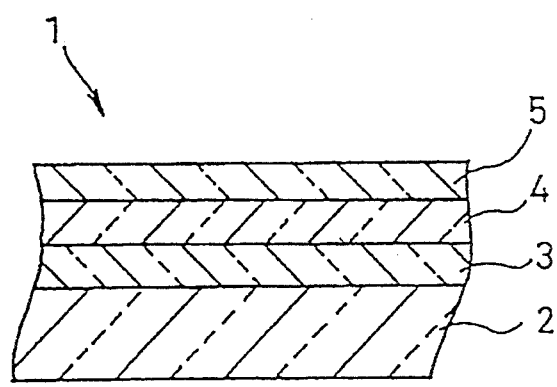
FIG. 1 shows a schematic fragmentary sectional view of one embodiment of the heat-screening glass according to the present invention.

The first protective film comprises at least one compound selected from the group consisting of silicon nitride ($SiN_x$), silicon dioxide ($SiO_2$), tin oxide ($SnO_2$), oxynitride of silicon carbide ($SiC_xO_yN_2$), and oxynitride of tantalum carbide ($TaC_xO_yN_z$).

The first protective film has a low refractive index and good wear resistance. In addition, the first protective film is preferably amorphous so that it prevents the crystal growth while the second protective film is being formed thereon. The first protective film preferably has a thickness of from 3 to 35 nm, and more preferably from 5 to 15 nm. With a thickness smaller than 3 nm, the first protective film tends to become discontinuous. With a thickness greater than 35 nm, the first protective film tends to have undesirably high visible light reflection ratio, in conjunction with the second protective film formed thereon.

The first protective film is designed to protect the heat-screening film even when the second protective film is damaged by chemicals, such as acids and alkalis, or wearing. Among the above-mentioned compounds, silicon dioxide ($SiO_2$), silicon nitride ($SiN_x$), and stannic oxide ($SnO_2$) are preferable because they permit efficient production of the heat-screening glass.

The second protective film comprises at least one compound selected from the group consisting of zirconium oxide ($ZrO_2$), tantalum pentoxide ($Ta_2O_5$), niobium oxide (NbO), zirconium oxynitride, tantalum oxynitride, and niobium oxynitride, and has a thickness of from 2 to 15 nm.

The second protective film, which is formed on the first protective film, influences the total wear and chemical resistance of the two-layered protective film, depending on its thickness. The total wear resistance of the two-layered protective film increases with the increase of the thickness of the second protective film up to 15 nm. However, if the second protective film is thicker than 15 nm, the wear resistance of the two-layered protective film becomes poorer than the case where the second protective film is not provided. This is because the protective films have a rough surface and increased internal stress on account of its granular, columnar, or crystalline structure. Therefore, the thickness of the second protective film should be 15 nm or less so that the heat-screening glass has better wear resistance than in the case where it has the first protective film alone.

If the thickness of the second protective film less than 2 nm, it becomes discontinuous and hence cannot protect the first protective film from acids and alkalis, and the two-layered protective film is not better in chemical resistance, especially alkali resistance, than in the case where the first protective film is used alone. Therefore, the thickness of the second protective film should be 2 nm or more so that the heat-screening glass has good chemical resistance.

By providing the second protective film on the first protective film, the heat-screening glass according to the present invention has better wear resistance and chemical resistance than in the case where either the first protective film or the second protective film is used alone.

The second protective film may contain a small amount of nitrogen, and therefore it may comprise at least one of zirconium oxynitride, tantalum oxynitride, and niobium oxynitride, which are included in the scope of the present invention. Among the above-mentioned compounds for the second protective film, zirconium oxide and tantalum oxide are preferably used.

The total thickness of the first and second protective films is preferably from 5 to 50 nm, more preferably from 20 to 30 nm, so that the heat-screening glass has a low reflectance in the visible region.

In view of the production efficiency of the two-layered protective film, the combination of the first protective film and the second protective film is preferably selected from (i) stannic oxide and tantalum pentoxide, (ii) oxynitride of silicon carbide ($SiC_xO_yN_z$) and tantalum pentoxide, (iii) stannic oxide and zirconium oxide, and (iv) oxynitride of silicon carbide ($SiC_xO_yN_z$) and zirconium oxide.

The heat-screening glass of the present invention has a heat-screening film formed on a transparent glass substrate. The material of the heat-screening film is not particularly limited and those described, e.g., in U.S. Pat. No. 4,716,068 can be used. Preferably, a metal nitride or a metal oxynitride that transmits as much visible light as possible and screens as much infrared light as possible are used. Preferred examples thereof include nitrides and oxynitrides of titanium, zirconium, hafnium, tantalum, and chromium. The thickness of the heat-screening film may be appropriately selected according to the intended visible light transmission. For example, in the case where the heat-screening glass of the present invention is used for automotive windows which need a visible light transmission higher than 70%, the thickness of the heat-screening film is preferably from 2 to 10 nm.

The heat-screening glass may optionally have a transparent dielectric film, as described, e.g., in U.S. Pat. No. 4,716,068, between the transparent glass substrate and the heat-screening film. The dielectric film is intended to improve adhesion between the transparent glass substrate and the heat-screening film and to control the color of the heat-screening glass. The transparent dielectric film may comprise titanium oxide ($TiO_2$), tin oxide ($SnO_2$), silicon dioxide ($SiO_2$), silicon oxynitride ($SiO_xN_z$), or silicon nitride ($Si_2N_4$).

The heat-screening film may be of a known multi-layer structure having wavelength selectivity, which composed of, for example, a film of titanium oxide ($TiO_2$), which has a high refractive index and is transparent in the visible region, and a film of silicon dioxide ($SiO_2$), which has a low refractive index and is transparent in the visible region.

The films constituting the heat-screening glass of the present invention may be formed by the direct current (dc) reactive sputtering method, as described, e.g., in U.S. Pat. No. 4,769,291. By using this method, films of uniform thickness on a large glass substrate for automotive and building heat-screening glass can efficiently produced.

The heat-screening glass of the present invention has two protective films, one being a first transparent protective film which is superior in wear resistance, the other being a second transparent protective film which is superior in chemical resistance. The second protective film has a specific thickness which prevents the growth of grains or the development of crystalline structure in the film. Therefore, the heat-screening glass exhibits higher chemical resistance without the loss of wear resistance than the case where the second protective film is not provided.

FIG. 1 shows a schematic fragmentary sectional view of one embodiment of the heat-screening glass of the present invention, in which heat-screening glass 1 is composed of transparent glass substrate 2, heat-screening film 3, first protective film 4, and second protective film 5. Heat-screening film 3 may be of single-layered or multi-layered structure.

The present invention is described in more detail by referring to the following examples but is not construed as being limited thereto.

EXAMPLE

Eleven samples of heat-screening glass were prepared by coating a 3.5 mm thick float glass plate ("Bronze-pane" made by Nippon Sheet Glass Co., Ltd.) with a heat-screening film, a first transparent protective film, and a second transparent protective film consecutively by the dc sputtering method using an in-line sputtering apparatus. The films varied in material and thickness as shown in Table 1. The heat-screening glass exhibited the optical properties and durability as shown in Table 2. The films were formed under the conditions shown in Table 3.

A large value of change in transmission means that the amount of wear of the protective film is large. A large value of change in haze means that the sample easily shows the sign of wear.

All the samples according to the present invention are excellent in wear resistance and hardly show the sign of wear, which is proved by the small change in transmission of 4.0% or less and the small change in haze of 2.0% or less. All the samples according to the present invention are excellent in both alkaline resistance and acid resistance, which is proved by the small changes in transmission and reflectivity of 1.0% or less.

TABLE 1

| | (Constitution of Films) | | |
| | Film material and thickness (nm) | | |
| Sample | Heat-screening film | 1st protective film | 2nd protective film |
| --- | --- | --- | --- |
| 1 | CrN (5) | $Si_3N_4$ (12.5) | $ZrO_2$ (7.5) |
| 2 | CrN (5) | $Si_3N_4$ (12.5) | $ZrO_2$ (15) |
| 3 | CrN (5) | $Si_3N_4$ (12.5) | $ZrO_2$ (2) |

TABLE 1-continued (Constitution of Films)
Film material and thickness (nm)

| Sample | Heat-screening film | 1st protective film | 2nd protective film |
|---|---|---|---|
| 4 | TiN (5) | SnO$_2$ (15) | Ta$_2$O$_5$ (5) |
| 5 | TiN (5) | SnO$_2$ (15) | Ta$_2$O$_5$ (15) |
| 6 | TiN (5) | SiCTaCNO (10) | NbO (10) |
| 7 | TiN (5) | SiCTaCNO (10) | NbO (15) |
| 8 | TiN (5) | SiCTaCNO (10) | NbO (2) |
| 9 | SnO$_2$ TiO$_2$ (65) (50) | SnO$_2$ (35) | ZrO$_2$ (15) |
| 10 | SnO$_2$ TiO$_2$ (65) (50) | SnO$_2$ (35) | Ta$_2$O$_5$ (10) |
| 11 | TiO$_2$ SiO$_2$ TiO$_2$ SiO$_2$ (100) (170) (100) (30) | SnO$_2$ (15) | ZrO$_2$ (15) |

The formula for the 1st protective film in Samples 6 to 8 (oxynitride of SiC and TaC) does not represent the stoichiometric amount.

TABLE 2

(Test Results)
Durability of protective films

| Sample | Wear resistance Change in transmission (%) | Wear resistance Change in haze (%) | Alkali resistance Change in transmission (%) | Alkali resistance Change in reflectivity (%) | Acid resistance Change in transmission (%) | Acid resistance Change in reflectivity (%) | Visible light transmission (%) |
|---|---|---|---|---|---|---|---|
| 1 | 3.2 | 1.5 | 0.3 | 0.4 | 0.1 | 0.1 | 73.8 |
| 2 | 2.8 | 1.4 | 0.3 | 0.3 | 0.1 | 0.0 | 72.1 |
| 3 | 4.0 | 1.8 | 0.8 | 0.8 | 0.3 | 0.2 | 74.5 |
| 4 | 3.8 | 1.6 | 0.5 | 0.3 | 0.1 | 0.1 | 72.8 |
| 5 | 2.8 | 1.5 | 0.3 | 0.4 | 0.1 | 0.1 | 70.4 |
| 6 | 3.4 | 1.5 | 0.4 | 0.5 | 0.1 | 0.2 | 73.8 |
| 7 | 3.1 | 1.8 | 0.8 | 0.9 | 0.2 | 0.3 | 73.5 |
| 8 | 4.0 | 1.9 | 1.0 | 0.9 | 0.3 | 0.2 | 74.2 |
| 9 | 3.3 | 1.9 | 0.4 | 0.5 | 0.1 | 0.1 | 75.3 |
| 10 | 3.9 | 1.9 | 0.8 | 0.7 | 0.2 | 0.2 | 75.0 |
| 11 | 3.6 | 1.6 | 0.5 | 0.5 | 0.3 | 0.5 | 78.8 |

Note:
The alkali resistance was determined by immersing the sample in a 0.1 N NaOH solution for 240 hours at room temperature.
The acid resistance was determined by immersing the sample in a 0.1 N HCl solution for 240 hours at room temperature.
The light transmission and the light reflectivity were measured by a spectrophotometer.
Wear resistance was measured by the Taber abrasion test (polishing cloth: CS-10F, number of rotation: 500).
The results were rated in terms of change in optical properties measured before and after the test.

TABLE 3

(Coating conditions)

| Film | Target | Pressure (Pa) | Gas composition (%) Ar | Gas composition (%) O$_2$ | Gas composition (%) N$_2$ |
|---|---|---|---|---|---|
| CrN$_x$ | Cr | 2 × 10$^{-1}$ | 60 | 0 | 40 |
| SiN$_x$ | Si | 2 × 10$^{-1}$ | 0 | 0 | 100 |
| ZrO$_2$ | Zr | 2 × 10$^{-1}$ | 0 | 100 | 0 |
| SnO$_2$ | Sn | 2 × 10$^{-1}$ | 40 | 60 | 0 |
| Ta$_2$O$_5$ | Ta | 2 × 10$^{-1}$ | 30 | 70 | 0 |
| TiN$_x$ | Ti | 2 × 10$^{-1}$ | 0 | 0 | 100 |
| Oxy-nitrides of SiC and TaC | SiC + TaC | 2 × 10$^{-1}$ | 0 | 50 | 50 |
| NbO | Nb | 2 × 10$^{-1}$ | 30 | 70 | 0 |
| TiO$_2$ | Ti | 2 × 10$^{-1}$ | 20 | 30 | 50 |
| SiO$_2$ | Si | 2 × 10$^{-1}$ | 10 | 30 | 60 |

Comparative Examples

Eight samples of heat-screening glass were prepared in the same manner as in Examples except for using the film construction and material as shown in Table 4. They exhibited the optical properties and durability as shown in Table 5.

TABLE 4

(Constitution of Films)
Film material and thickness (nm)

| Sample | Heat-screening film | 1st protective film | 2nd protective film |
|---|---|---|---|
| 1 | CrN (5) | Si$_3$N$_4$ (20) | — |
| 2 | CrN (5) | Si$_3$N$_4$ (20) | ZrO$_2$ (25) |
| 3 | TiN (5) | — | Ta$_2$O$_5$ (20) |
| 4 | TiN (5) | SnO$_2$ (15) | Ta$_2$O$_5$ (30) |
| 5 | TiN (5) | SnO$_2$ (15) | — |
| 6 | SnO$_2$ TiO$_2$ (65) (50) | SiCTaCNO (55) | — |
| 7 | SnO$_2$ TiO$_2$ (65) (50) | SiCTaCNO (40) | NbO (25) |
| 8 | SnO$_2$ TiO$_2$ (170) (100) | — | NbO (50) |

The formula for the 1st protective film in Comparative Samples 6 and 7 (oxynitride of SiC and TaC) does not represent the stoichiometric amount.

TABLE 5

| | (Test Results) Durability of protective films | | | | | | |
|---|---|---|---|---|---|---|---|
| | Wear resistance | | Alkali resistance | | Acid resistance | | Visible light transmission (%) |
| Sample | Change in transmission (%) | Change in haze (%) | Change in transmission (%) | Change in reflectivity (%) | Change in transmission (%) | Change in reflectivity (%) | |
| 1 | 3.3 | 1.7 | 3.5 | 4.0 | 0.2 | 0.2 | 73.6 |
| 2 | 3.5 | 3.1 | 0.4 | 0.4 | 0.1 | 0.1 | 71.1 |
| 3 | 4.5 | 2.5 | 0.6 | 0.5 | 0 | 0.2 | 73.1 |
| 4 | 3.8 | 3.5 | 0.2 | 0.3 | 0.1 | 0.2 | 70.4 |
| 5 | 3.4 | 1.8 | 4.3 | 5.1 | 2.8 | 3.1 | 73.2 |
| 6 | 5.1 | 1.9 | 0.3 | 0.4 | 0.1 | 0.2 | 75.8 |
| 7 | 4.8 | 2.2 | 0.8 | 0.7 | 0.3 | 0.2 | 76.3 |
| 8 | 4.5 | 3.1 | 0.5 | 0.4 | 0.1 | 0.3 | 79.5 |

Comparative Sample 1, which lacks the second protective film, is extremely poor in alkali resistance as demonstrated by the great change (3.5%) in transmission observed after the alkali resistance test. Comparative Sample 5, which lacks the second protective film, is poor in both acid and alkali resistance as demonstrated by the great change (4.3%) in transmission observed after the acid resistance test and the great change (2.8%) in transmission observed after the alkali resistance test. Comparative Sample 6, which lacks the second protective film, is poor in wear resistance although it is good in acid and alkali resistance.

Comparative Samples 3 and 8, both lacking the first protective film, are poor in wear resistance as indicated by the great change (4.5%) in transmission observed after the wear resistance test. Moreover, the protective film of these samples easily shows the sign of wear as demonstrated by the great change in haze.

Comparative Samples 2, 4, and 7 have both the first and second protective films but do not accord with the present invention in that the second protective film is thicker than 15 nm. Therefore, they exhibit good acid and alkali resistance but easily show the sign of wear which is indicated by the high haze value.

The above-mentioned examples demonstrate that the samples according to the present invention are superior in wear resistance and acid and alkali resistance and do not easily show the sign of wear even when the protective film wears to some extent.

The present invention provides heat-screening glass having improved acid and alkali resistance and wear resistance which can be used in a single glazing. The heat-screening glass does not show the sign of wear even when the outer protective film wears. The heat-screening glass can be produced efficiently because it only needs thin protective films.

While the invention has been described in detail and with reference to specific examples thereof, it will be apparent to one skilled in the art that various changes and modifications can be made therein without departing from the spirit and scope thereof.

What is claimed is:

1. Heat-screening glass consisting essentially of a transparent glass substrate having consecutively thereon a heat-screening film, a first transparent protective film, and a second transparent protective film, said first transparent protective film comprising at least one member selected from the group consisting of silicon nitride, silicon dioxide, stannic oxide, oxynitride of silicon carbide, and oxynitride of tantalum carbide, and having a thickness of from 3 to 35 nm, and said second transparent protective film comprising at least one member selected from the group consisting of zirconium oxide, tantalum pentoxide, niobium oxide, zirconium oxynitride, tantalum oxynitride, and niobium oxynitride, and having a thickness of from 2 to 15 nm.

2. Heat-screening glass as claimed in claim 1, wherein said heat-screening film comprises a metal nitride or a metal oxynitride.

3. Heat-screening glass as claimed in claim 1, wherein the total thickness of said first and second transparent protective films is from 5 to 50 nm.

4. Heat-screening glass as claimed in claim 3, wherein the total thickness of said first and second transparent protective films is from 20 to 30 nm.

5. Heat-screening glass as claimed in claim 1, which has a visible light transmission of 70% or more.

6. Heat-screening glass as claimed in claim 5, wherein the thickness of said heat-screening film is from 2 to 10 nm.

7. Heat-screening glass as claimed in claim 1, wherein said first transparent protective layer comprises at least one member selected from the group consisting of silicon nitride, silicon dioxide, and stannic oxide.

8. Heat-screening glass as claimed in claim 1, wherein said second transparent protective layer comprising at least one member selected from the group consisting of zirconium oxide and tantalum pentoxide.

* * * * *